United States Patent
Shan et al.

(10) Patent No.: US 11,846,786 B2
(45) Date of Patent: Dec. 19, 2023

(54) DIFFRACTIVE OPTICAL ELEMENT AND METHOD FOR MANUFACTURING THE SAME

(71) Applicant: SCHOTT Glass Technologies (Suzhou) Co. Ltd., Jiangsu (CN)

(72) Inventors: Yanquan Shan, Suzhou (CN); Guangjun Zhang, Shanghai (CN); Pengxiang Qian, Shanghai (CN); Thomas Wiegel, Alfeld (DE)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 840 days.

(21) Appl. No.: 16/918,829

(22) Filed: Jul. 1, 2020

(65) Prior Publication Data

US 2021/0003855 A1 Jan. 7, 2021

Related U.S. Application Data

(63) Continuation of application No. PCT/CN2019/094209, filed on Jul. 1, 2019.

(51) Int. Cl.
*G02B 27/42* (2006.01)
*G02B 5/08* (2006.01)
(Continued)

(52) U.S. Cl.
CPC .... *G02B 27/4233* (2013.01); *B29D 11/00769* (2013.01); *G02B 5/1857* (2013.01)

(58) Field of Classification Search
None
See application file for complete search history.

(56) References Cited

U.S. PATENT DOCUMENTS 6,670,105 B2   12/2003   Terada
2004/0180773 A1*  9/2004   Schreder ............... G02B 6/13
                                                             501/7
(Continued)

FOREIGN PATENT DOCUMENTS

CN   104326440   2/2015
CN   104583812   4/2015
(Continued)

OTHER PUBLICATIONS

International Search Report dated Mar. 26, 2020 for corresponding International Application PCT/CN2019/094209.

(Continued)

*Primary Examiner* — Allan W. Olsen
(74) *Attorney, Agent, or Firm* — Ruggiero McAllister & McMahon LLC

(57) ABSTRACT

A diffractive optical element is provided that includes at least two layers with different etching speeds for dry etching process. The diffractive optical element has a substrate of glass and a microstructure layer arranged on the substrate. The ratio of dry etching speed in thickness direction of the substrate to that of the microstructure layer is no more than 1:2 so that the substrate functions as an etching stop layer. The ratio of dry etching speed in horizontal direction of the substrate is substantially equal to that of the microstructure layer. The composition of glass includes, but is not limited to, $Al_2O3$, alkaline material ($M_2O$) and alkaline earth material (MO), where the weight percentage of $Al_2O_3+M_2O+MO>=5\%$.

27 Claims, 3 Drawing Sheets

(51) Int. Cl.
*B29D 11/00* (2006.01)
*G02B 5/18* (2006.01)

(56) References Cited

U.S. PATENT DOCUMENTS

| | | | |
|---|---|---|---|
| 2006/0051584 A1* | 3/2006 | Bieck | B81C 1/00269 |
| | | | 257/E21.28 |
| 2008/0248250 A1* | 10/2008 | Flemming | C03C 3/095 |
| | | | 216/87 |
| 2008/0254372 A1* | 10/2008 | Wu | G03H 1/02 |
| | | | 430/2 |
| 2011/0217657 A1* | 9/2011 | Flemming | H01L 23/49827 |
| | | | 29/874 |
| 2015/0160377 A1 | 6/2015 | Kuroda | |
| 2016/0248047 A1* | 8/2016 | Lee | F21K 9/90 |
| 2018/0186689 A1 | 7/2018 | Melli | |

FOREIGN PATENT DOCUMENTS

| | | |
|---|---|---|
| JP | H06209143 | 7/1994 |
| JP | H07104112 | 4/1995 |
| JP | 2005091001 | 4/2005 |
| JP | 2010171265 | 8/2010 |
| RU | 2642139 | 1/2018 |

OTHER PUBLICATIONS

Written Opinion dated Mar. 26, 2020 for corresponding International Application PCT/CN2019/094209.

* cited by examiner

DIFFRACTIVE OPTICAL ELEMENT AND METHOD FOR MANUFACTURING THE SAME

CROSS REFERENCE TO RELATED APPLICATIONS

This application is a continuation of International Application PCT/CN2019/094209 filed on Jul. 1, 2019, the entire contents of which are incorporated by reference herein.

BACKGROUND

1. Field of the Invention

The present invention relates to a diffractive optical element in optical field, which has at least two layers having different etching speeds and a method for manufacturing the diffractive optical element.

2. Description of Related Art

Diffractive optical elements (DOE) are used in various kinds of optical devices, optical components and optical apparatuses, where the diffraction function is needed. Generally, the DOE converts a laser beam, of which the shape can be controlled and changed flexibly according to application needs. In many applications, these functions are highly beneficial and improve system performance significantly. The DOE has advantages in many aspects, such as, high efficiency, high precision, small dimensions, low weight, and, most importantly, is so flexible that meets a variety of different application' requirements.

A DOE utilizes a surface with a complex microstructure for its optical function. The micro-structured surface relief profile has two or more surface levels. The microstructure could be created by nanoimprint, wet etching, or dry etching. Usually, dry etching and direct writing are used to fabricate DOE due to the high precise requirement. In particularly, the microstructure is in particularly produced by direct laser writing and lithography combined with plasma etching, such as reactive ion etching (RIE), or inductively coupled plasma etching (ICP).

Feature sizes of DOE include etching width and etching depth. Typical feature sizes of DOE range from submicrometer to millimeter in lateral dimensions and a few hundred nanometers in vertical dimension. For 3D imaging and sensing, it is necessary to combine multiple optical functionalities, such as beam shaping and focusing. As an example, a DOE with a single layer of binary surface relief for multiple-stripe structured illumination combines functions of a diffractive lens, Gaussian-to-tophat beam shaper and Dammann beam splitter.

Silicon or fused silica is the material used in current market due to compatible etching behavior to dry etching. But the silicon has a limited transmission in visible to near infrared light, it cannot be used in transmissive DOE where the high transmission is needed. Fused silica is a good material for dry etching, since the etching speed is fast. But for some applications with high precision etching requirement, such as DOE, the etching speed is too fast to control the etching depth.

In this case, for DOE, it is desirable to precisely control the etching depth of the microstructures.

SUMMARY

It is an object of the invention to provide a DOE for an optical three-dimensional measuring device, which has microstructures with precise depth via dry etching. The dry etching method include ion beam etching, ion etching, reactive ion beam etching, reactive ion etching, plasma etching and barrel etching.

This object is solved by the DOE and the method as defined herein.

In an aspect of the present invention, a diffractive optical element comprising at least two layers with different etching speeds for dry etching process is provided. The diffractive optical element comprises a substrate of glass and a microstructure layer arranged on the substrate of glass. The ratio of dry etching speed in thickness direction of the substrate of glass to that of the microstructure layer is no more than 1:2, preferably no more than 1:5, more preferably no more than 1:10 or most preferably no more than 1:20, so that the substrate functions as an etching stop layer. However, the ratio of dry etching speed in horizontal direction of the substrate of glass is substantially equal to that of the microstructure layer. The substrate of glass comprises $SiO_2$, $Al_2O_3$, alkaline metal oxides $M_2O$ and alkaline earth metal oxides MO with a sum of content $\Sigma Al_2O_3+M_2O+MO >= 5$ wt %, preferably $\Sigma Al_2O_3+M_2O+MO >= 7$ wt %, more preferably $\Sigma Al_2O_3+M_2O+MO >= 8$ wt %, in particular preferably $\Sigma Al_2O_3+M_2O+MO >= 10$ wt % and most preferably $\Sigma Al_2O_3+M_2O+MO >= 15$ wt %. $M_2O$ include $Li_2O$, $Na_2$, $K_2O$, and other alkaline metal oxides, MO include CaO, MgO, BaO, SrO, and other alkaline earth metal oxides. Additionally, the substrate of glass exhibits a refractive index in a range from 1.40 to 2.2 in wavelength 587.6 nm, more preferably 1.41 to 2.1, more preferably 1.42-2.0, more preferably 1.45-1.9, more preferably 1.45-1.8.

In this aspect, since the substrate of glass exhibits a much lower etching speed than that of the microstructure layer, the substrate of glass may function as an etching stop layer. In this case, the etched depth of the microstructure layer, e.g., the height of the grating structure in one microstructure layer is controlled in high precision. At meantime, the substrate of glass as a stop layer also reduce the etching speed of microstructure layer in the horizontal direction and improve the taper performance. Additionally, the glass is a transparent and isotropic material. It is a solid and homogeneous bulk without different separated layers, and thus, the optical performance is stable. The glass is also of a chemical durable material for different applications and process availability. Above all, the glass has low etching speed, which will prevent the etching on the substrate of substrate to avoid over etching. In some cases of using fused silica as substrate, a thicker coating layer is needed to avoid the etching on the substrate. Otherwise, the substrate surface will be destroyed and the optical performance is weakened.

In one embodiment of present invention, the microstructure layer has fine feature dimension with etched width <2000 µm, preferably <1000 µm, more preferably <800 µm, more preferably <500 µm, even more preferably <300 µm, and most preferably <200 µm.

In a further embodiment of present invention, each step of microstructure layer has fine feature dimension with etched depth <1000 µm, preferably <800 µm, more preferably <600 µm, even more preferably <500 µm and most preferably <400 µm.

In a further embodiment of present invention, the maximum deviation between the etched depth in microstructure layer and its mean etching depth is less than 30% of its mean etching depth, more preferably less than 20%, most preferably less than 10%.

In a further embodiment of the present invention, the microstructure layer is made of silicon oxide (SixOy) or silicon nitride (SixNy) or $TiO_2$ or $Ta_2O_5$ or $Nb_2O_5$ or $CeO_2$ or $MgF_2$ or the combination thereof. x;y includes 1:2, or 3:4, but it does not limits the ratio written here. The silicon oxide could be one single phase or the mixture of several phases. Silicon oxide is the best material for this DOE application. It has low reflective index, which will improve the light transmission efficiency. Additionally, the microstructure layer is nonconductive, which has electric resistivity larger than $10^{10}$ Ω·m.

In a further embodiment of the present invention, the substrate of glass has a refractive index substantially equal to that of the microstructure layer in visible and infra-red range.

In a further embodiment of the present invention, the substrate of glass exhibits a refractive index in a range from 1.40 to 2.2 in wavelength 587.6 nm, preferably in a range from 1.41 to 2.1, preferably in a range from 1.42 to 2.0 preferably in a range from 1.45 to 1.9, preferably in a range from 1.45 to 1.8, In a further embodiment of the present invention, the microstructure layer exhibits a refractive index in a range from 1.4 to 2.2 in wavelength 587.6 nm. The difference of refractive index between the microstructure layer and glass substrate in the range of −0.65 to 0.65.

In a further embodiment of the present invention, the substrate of glass exhibits an internal transmittance of higher than 96%, preferably higher than 98%, and most preferably higher than 99% for visible light to infrared light. In addition, the transmittance is less than 30% when the wavelength is lower than 200 nm.

In a further embodiment of the present invention, the diffractive optical element exhibits an efficiency of higher than 30%, preferably higher than 40%, more preferably higher than 50%, or even more preferably higher than 60% and most preferably higher than 70%.

In a further embodiment of the present invention, the diffractive optical element includes a further layer for electric conduction or protection applied on upper surface of the microstructure layer or on the bottom surface of the substrate of glass or between the microstructure layer and the substrate of glass. The further layer is an electric conductive layer, which could be ITO or metal. The further layer is a very thin layer (nanometer level or less) which is easy to be etched through in some case of the dry etching process. Glass used as substrate layer will avoid the over etching.

In a further embodiment of the present invention, the substrate of glass exhibit an etching speed in the thickness direction in a range from 0.01 to 0.8 μm/min, preferably in a range from 0.01 to 0.3 μm/min for etching gas of $C_4F_8$ or $SF_6$ with plasma power 1600 W; substrate power 200 W; Gas flow of 25 SCCM; and pressure 0.2 Pa.

In a further embodiment of the present invention, the substrate of glass exhibits a Total Thickness Variation (TTV) of less than 30 μm, preferably less than 20 μm, more preferably less than 10 μm, 5 μm, 3 μm, or 2 μm, and most preferably less than 1 μm.

In a further embodiment of the present invention, the substrate of glass exhibits a warp of less than 400 μm, preferably less than 300 μm, 200 μm, 100 μm, 50 μm, or 20 μm, and most preferably less than 10 μm.

In a further embodiment of the present invention, the diffractive optical element comprises more than one pairs of one substrate of glass and one microstructure layer stacked above each other.

In a further embodiment of the present invention, the substrates of glass and the microstructure layers are alternately arranged above each other.

In this case, the microstructure layers could be arranged on both sides of the substrate of glass.

Alternatively, the substrates of glass and the microstructure layers are arranged in such away that at least two microstructure layers contact with each other.

In this case, the microstructure layer could be fabricated by ion beam etching, or ion etching, or reactive ion beam etching, or reactive ion etching, or plasma etching or barrel etching. In a further embodiment of the present invention, the light pattern generated by diffractive optical element could be square, triangle, spot, line but not limited to these.

In a further embodiment of the present invention, the glass substrate can have antireflection coating.

In a further embodiment of the present invention, the total thickness of microstructure layer can be controlled precisely by the different etching ratio of glass substrate layer and microstructure layer. When the biggest etching depth is fixed during design, the total thickness of microstructure layer can be determined according to the biggest etching depth. In the case, the total thickness of microstructure layer ($T_{max}$) equals to the biggest etching depth ($H_{max}$) plus the tolerance of designed etching depth (δ) for application of the microstructure, which could be shown as:

$$T_m = H_{max} + \delta.$$

That is to say, the thickness ($T_{max}$) of the applied microstructure layer should be equal or larger than the etching depth ($H_{max}$). The tolerance of designed etching depth is 0.001% of $H_{max}$, 0.01% of $H_{max}$, 0.1% of $H_{max}$, 1% of $H_{max}$, 10% of $H_{max}$, 15% of $H_{max}$, 20% of $H_{max}$, or 30% of $H_{max}$. In the case of one step of microstructure layer, the total thickness of microstructure layer equals to the etching depth of one step. Ideally, the thickness equal to the etching depth. This could be used in the design of the thickness of coating layer and saving cost. Furthermore, as the extension of this technical feature, the biggest etching depth can be controlled also by controlling the total thickness of microstructure layer because of the different etching ratio of glass substrates and microstructure layer. By precisely controlling the coating process, the total thickness of microstructure layer with a high accuracy can be achieved. Thus the etching depth can determined because the etching will stop when the glass substrate is reached after etching through the total microstructure layer.

The dry etching rate is very important in DOE fabrication to achieve the precise etching depth. Glass material will react with $CF_4$ according to the equation below:

$$SiO_2 + CF_4 \rightarrow SiF_4 + CO_2$$

$$2B_2O_3 + 3CF_4 \rightarrow 4BF_3 + 3CO_2.$$

The byproducts of $SiF_4$ and $BF_3$ have low boiling points and are in gaseous state at normal condition. However, the byproducts from aluminum oxide, alkali oxides and alkali earth oxides ($AlF_3$, KF, NaF, $BaF_2$, $MaF_2$, $CaF_2$, $SrF_2$) have high boiling points and are solid state in normal condition. These solid byproducts remain on the etched area, reducing the etching rate and influencing the roughness and morphology of the etched surface.

TABLE 1

Boiling points of conventional reaction byproducts during dry etching

| By product | $SiF_4$ | $BF_3$ | $CO_2$ | $AlF_3$ | KF | NaF | $BaF_2$ | $MaF_2$ | $CaF_2$ | $SrF_2$ |
|---|---|---|---|---|---|---|---|---|---|---|
| Boiling points (° C.) | −86 | −100 | −78 | 1291 | 1505 | 1700 | 2260 | 2260 | 2500 | 2460 |

Preferably, total contents of $Al_2O_3$, alkaline metal oxides ($M_2O$) and alkaline earth metal oxides (MO) is preferably more than 10 wt % and more preferably more than 15 wt %.

The higher content of $Al_2O_3+M_2O+MO$, the lower etching speed and lower etching surface roughness. In the DOE application, surface roughness can induce light scattering and reduce the diffraction efficiency, which highly influences the DOE performance.

In the present application, the substrate of glass exhibits a surface roughness of less than 10 nm, preferably less than 2 nm and most preferably less than 1 nm.

Due to the lower etching speed of glass material compared to fused silica, it functions as a good stop layer in the dry etching process. The maximum deviation between the etching depth in microstructure layer and its mean etching depth is less than 30% of its mean etching depth. In one diffractive optical elements model, only change the glass substrate from fused silica to D263, the diffraction efficiency increased from around 10% to over 40%.

The following glasses with the corresponding compositions are preferred and have shown a low etching speed when treated with the dry etching method according to the invention as well as an excellent increase in strength if the post-treatment is applied. However, the invention is also suited for other compositions and has proven to be advantageous for numerous other glasses and glass ceramics.

A preferred glass used in the method according to the invention is a lithium aluminosilicate glass with the following composition (in wt. %):

| Composition | (wt. %) |
|---|---|
| $SiO_2$ | 55-69 |
| $Al_2O_3$ | 18-25 |
| $Li_2O$ | 3-5 |
| $Na_2O + K_2O$ | 0-30 |
| $MgO + CaO + SrO + BaO$ | 0-5 |
| ZnO | 0-4 |
| $TiO2$ | 0-5 |
| $ZrO_2$ | 0-5 |
| $TiO_2 + ZrO_2 + SnO_2$ | 2-6 |
| $P_2O_5$ | 0-8 |
| F | 0-1 |
| $B_2O_3$ | 0-2 |

Another preferred glass used in the method according to the invention is a soda lime glass with the following composition (in wt. %):

| Composition | (wt. %) |
|---|---|
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Another preferred glass used in the method according to the invention is a borosilicate glass with the following composition (in wt. %):

| Composition | (wt. %) |
|---|---|
| $SiO2$ | 60-85 |
| $Al_2O_3$ | 0-10 |
| $B_2O_3$ | 5-20 |
| $Li_2O + Na_2O + K_2O$ | 2-16 |
| $MgO + CaO + SrO + BaO + ZnO$ | 0-15 |
| $TiO_2 + ZrO_2$ | 0-5 |
| $P_2O_5$ | 0-2 |

Another preferred glass used in the method according to the invention is an alkali metal aluminosilicate glass with the following composition (in wt. %):

| Composition | (wt. %) |
|---|---|
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Another preferred glass used in the method according to the invention is a low alkali metal aluminosilicate glass with the following composition (in wt. %):

| Composition | (wt. %) |
|---|---|
| $SiO_2$ | 50-75 |
| $Al_2O_3$ | 7-25 |
| $B_2O_3$ | 0-20 |
| $Li_2O + Na_2O + K_2O$ | 0-4 |
| $MgO + CaO + SrO + BaO + ZnO$ | 5-25 |
| $TiO_2 + ZrO_2$ | 0-10 |
| $P_2O_5$ | 0-5 |

The glasses used in the invention, in particular the above mentioned glasses, can also be modified. For example, the color can be modified by adding transition metal ions, rare earth ions as e.g. $Nd_2O_3$, $Fe_2O_3$, CoO, NiO, $V_2O_5$, $MnO_2$, $TiO_2$, CuO, $CeO_2$, $Cr_2O_3$, and 0-2 wt. % of $As_2O_3$, $Sb_2O_3$, $SnO_2$, $SO_3$, Cl, F, and/or $CeO_2$ into the glass compositions. Such modifying color can either enrich the design of consumer electronics such as color requirements for back covers or can provide an additional function for the ultrathin glass article as e.g. as color filters. In addition, luminescence ions, such as transition metal and rare earth ions can be added in order to endow optical functions, such as optical amplifiers, LEDs, chip lasers etc. In particular, 0-5 wt. % of rare earth oxides can be added to introduce magnetic, photon or optical functions.

The glass article can also be provided with an antimicrobial function by applying an ion-exchange of the glass article in an Ag-containing salt bath or a $Cu^{2+}$-containing salt bath. After the ion-exchange the concentration of Ag or $Cu^{2+}$ is higher than 1 ppm, preferably higher than 100 ppm, and more preferably higher than 1000 ppm. The ultrathin glass with anti-microbial function could be applied for medical equipment such as computer or screen used in hospitals and consumer electronics with anti-microbial function.

Further preferred variations of such glasses can be found in PCT/CN2013/072695 and are hereby incorporated by reference.

In an aspect of the present disclosure, the diffractive optical element comprises a substrate of glass that has a coefficient of thermal expansion (CTE) of at most 15 ppm/K. In an aspect, the diffractive optical element has a ratio of CTE of the substrate of glass to that of the microstructure layer of at least 0.1.

BRIEF DESCRIPTION OF THE DRAWINGS

The invention will now be described in more detail by way of exemplary embodiments and with reference to the accompanying drawings. In the drawings, the same reference numerals designate the same or corresponding elements. In the drawings.

DETAILED DESCRIPTION

Figure 1:
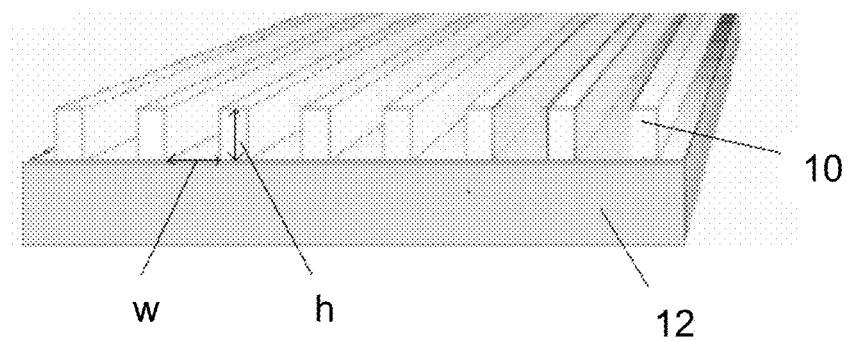
FIG. 1 illustrates a DOE with a glass substrate and one layer of microstructures according to the present invention.

FIG. 1 illustrates a DOE, according to the present invention. The DOE 1, for example, diffuser, includes a microstructure layer 10 and a substrate of glass 12. In one embodiment, the glass is available in the market with the brand D263, AF32, B270, or BF33 from Schott AG. In one embodiment, the DOE structure is $SiO_2$ layer or other coating materials, such as silicon nitride, which is available for DOE structure. In FIG. 1, the DOE structure is a microstructure of diffractive grating. The diffractive grating could be obtained by dry etching process on $SiO_2$ layer or the other coating materials. The glass has a feature of much lower dry etching speed compared to $SiO_2$ layer or the other coating materials and thus, the glass is a good stop-layer so that the etching depth in the $SiO_2$ layer or the other coating can be controlled well and etching tolerance can be small. One of example is the etching depth is usually controlled by the thickness of coating material. Furthermore, as compared to fused silica used in the art, the glass is cheap in view of cost, but it has similar temperature shift as fused silica.

Additionally, the refractive index $n_d$ of $SiO_2$ layer is of 1.5 to 1.6 and the refractive index nd of silicon nitride is less than 2.1. compared to the this, the glass has similar values in a range of 1.40 to 2.2, preferably in a range from 1.45 to 1.8, for example, the glass available in the market from Schott AG, such as AF32eco 1.51, D263Teco 1.52, BF33 1.47. Since the substrate of glass 12 has similar refractive index as the microstructure layer 10 made of $SiO_2$, the matched refractive index will reduce the light loss on the boundary between the substrate of glass 12 and the microstructure layer 10.

In the present invention, the substrate of glass 12 has an internal transmittance of higher than 96%, preferably higher than 98%, and most preferably higher than 99% for visible light to infrared light, e.g., at a wavelength in a range from 300 nm to 1200 nm, preferably at 810 nm, 830 nm, 850 nm or 940 nm. Transmission equal 100% minus reflection and absorption. The higher internal transmittance, the substrate of glass 12 has, the less of reflection, the higher efficiency, the DOE can achieve. According to different designs of the diffractive grating features, the DOE 1 can achieve an efficiency of higher than 30%, preferably higher than 50% or more preferably higher than 70%.

The size of glass is flexible according to the processing required. Wafer size is preferred for wafer level packing process. The edge of the wafer could be fabricated as frosting surface by etching, coating, printing, sandblasting to offer a non-transparent area for locating in post processing.

In an additional or alternative aspect, the DOE may include more than two layers. For example, a further layer could be applied between the substrate of glass 12 and the microstructure layer 10, on the bottom surface of the substrate of glass 12 or on the upper surface of the microstructure layer 10. The further layer may fulfill other functions, e.g., electric conduction or protection. Based on the different functions of the further layer, it may include ITO (indium tin oxide), Ag, Au, Cr, Pt, Cu and so on.

In a further aspect, according to different applications, the DOE may include more than one microstructure layers, e.g., two, three or four microstructure layers.

Figure 2A:
FIGS. 2a-2d illustrates a method according to the present invention for manufacturing the DOE shown in FIG. 1.
Figure 2B:

Now, referring to FIGS. 2a to 2d, which shows the steps of manufacturing the DOE 1 according to the present invention. Firstly, a substrate of glass 12 is provided a layer of $SiO_2$ 10' is coated on the substrate of glass 12, for example, by CVD or PVD method. Subsequently, a mask layer 14 is coated on the layer of $SiO_2$ 10', e.g., by spin coating, as shown in FIG. 2a. Subsequently, the masking layer 14 is removed on the area, corresponding to the layer of $SiO_2$ 10' to be etched, is removed, by photolithography process, as shown in FIG. 2b.

Now, a dry etching process is performed on the layer of $SiO_2$ 10' through the via in the pattern of the masking layer 14. During the dry etching process, a high density of plasma is generated by a Radio Frequency (RF) electromagnetic filed created by the external antenna. The layer of $SiO_2$ 10' is etched by chemically reactive gas plasma. Normally, the chemically reactive gas includes perfluoropropane ($C_3F_8$), perfluoroisobutylene ($CF_8$), carbon tetrafluoride ($CF_4$) or sulfur hexafluoride ($SF_6$). Beside the above reactive gas, oxygen ($O_2$), Argon (Ar), Nitrogen (N), Helium (He) or chlorine (Cl) could be used together.

As known in the art, the dry etching method include ion beam etching, ion etching, reactive ion beam etching, reactive ion etching, plasma etching and barrel etching.

According to one embodiment, the DOE structure is produced by RIE. In a preferable embodiment, the RIE process is performed with the following parameters range as listed in TABLE 1. In a preferable embodiment, the etching process is performed with the parameters: plasma power 1600 w; substrate power 200 w; Gas $C_4F_8$ with a flow of 25 SCCM; and pressure 0.2 Pa. In this case, the etching time is 15 minutes.

TABLE 2

Etching speed range of different materials

| Glass | Etching speed (μm/min) | RIE related parameters | | | | |
|---|---|---|---|---|---|---|
| | | Plasma power (W) | Substrate power (W) | Reactive gas | Gas flow (SCCM) | Pressure (Pa) |
| D263 | 0.01-0.3 | 200-2500 | 50-500 | $C_4F_8$ or $SF_6$ or $C_4F_8$/Ar or $SF_6$/Ar | 5-50 | 0.1-1 |
| AF32 | 0.01-0.3 | | | | | |
| B270 | 0.01-0.3 | | | | | |
| BF33 | 0.02-0.8 | | | | | |
| $SiO_2$ (fused silica) | 0.3-1.3 | | | | | |
| $SiO_2$ coating layer | 0.2~1.0 | | | | | |

Here, the process for forming DOE structure is briefly introduced with detail test examples for explaining the etching speed of different glass material as compared to the layer of $SiO_2$. Besides, the microstructure is not limited to mentioned structure in this invention.

Embodiment 1

The test has been done via RIE with related parameters of, plasma power 1600 w, substrate power 200 w, gas $C_4F_8$ with a flow of 25 SCCM, and pressure 0.2 Pa.

TABLE 3

Etching speed values of different materials

| Substrate | Fused silica | D263 | AF32 | B270 | BF33 | $SiO_2$ coating |
|---|---|---|---|---|---|---|
| Etching speed (nm/min) | 345 | 56 | 15 | 12 | 146 | 279 |

Embodiment 2

In this embodiment, the substrate of glass consists of AF32 glass. Firstly, the substrate of glass is cut into size of 50*50 mm. subsequently, the layer of $SiO_2$ is sputtering on the surface of substrate of glass. The thickness of the layer of $SiO_2$ is 2.021 μm. Then, the mask layer is spin coated on the layer of $SiO_2$ and vias through the mask layer are produced by photolithography method. The target width of the via is 50 nm. The dry etching process is performed by RIE with related parameters: plasma power of 1600 w, substrate power of 200 w, gas of $C_4F_8$ with a flow of 25 SCCM and pressure of 0.2 Pa.

TABLE 4

| etching depth | | | | |
|---|---|---|---|---|
| Etching time (min) | 2 | 5 | 8 | 10 |
| Measured etching depth (nm) (include $SiO_2$ layer and AF32 substrate) | 618 | 1382 | 2023 | 2056 |

From TABLE 4, it can be seen that from 2 mins to 8 mins of etching time, the etching depth increasing fast due to high etching rate of $SiO_2$ layer. From 8 mins to 10 mins of etching time, the etching depth does not change much due to the low etching speed of AF32 glass. From the above, it can be determined that glass AF32 could be a good stop to control the etching precision.

Figure 2C:
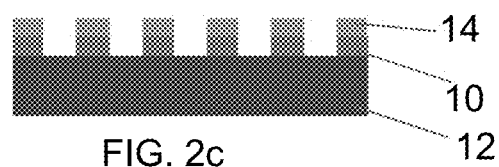
Figure 2D:
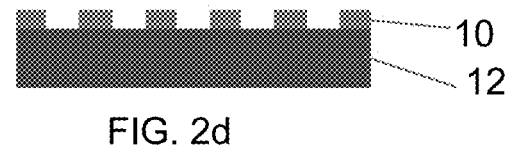

After dry etching process, the microstructure layer 10 is obtained, see FIG. 2c. Subsequently, the mask layer 14 is removed and the DOE 1 with one layer of DOE structure is achieved, as shown in FIG. 2d. In an embodiment, the depth of the DOE structure h is from 500 nm to 10 μm and the width thereof w is width of the structure is from 10 nm to 500 nm.

From TABLE 1, it also can be seen that the substrate of glass, e.g., glass D263, AF32, B270, BF33 from Schott AG, exhibits much lower etching speed as compared to the layer of $SiO_2$ 10' or fused silica. Preferably, the ratio of dry etching speed in thickness direction of the substrate of glass 12 to that of the microstructure layer 10 is no more than 1:2, preferably no more than 1:5, more preferably no more than 1:10 or most preferably no more than 1:20. Due to the lower etching speed of the substrate of glass 12 as compared to layer of $SiO_2$ 10', the substrate of glass 12 can be act as etching stop layer and thus, the etching tolerance of DOE structure depth, which is most close to the thickness of the layer of $SiO_2$ 10', is much easier to be controlled. Additionally, the ratio of dry etching speed in horizontal direction of the substrate of glass is close to that of the microstructure layer 10.

Figure 4:
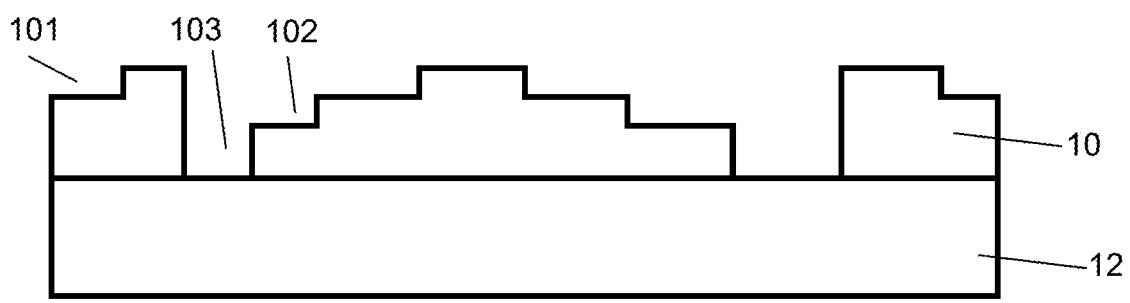
FIG. 4 illustrates a structure with three steps of one microstructure layer according to the present invention.

In an embodiment, the grating structure might include one step, two steps, three steps, . . . seven steps. As shown in FIG. 4, it shows a grating structure with three steps, 101, 102, 103. In this case, at least the bottom step 103 can has high precision with dry etch process, which also improve the efficiency as well as performance of the DOE.

As obvious for a person skilled in the art, the DOE structure can be created with dry etching process. However, the process for generating the DOE structure should not be limited to dry etching process. Any other methods that can generate DOE structures can be used. For example, the DOE structure could also be achieved by direct writing, such as laser direct writing and electron beam exposure.

After producing the DOE structure 10 on the substrate of glass 12, post process can be performed, e.g., dicing, so as to produce individual pieces of DOEs 1. For this purpose, dicing can include sawing, laser dicing and other dicing process.

Figure 3A:
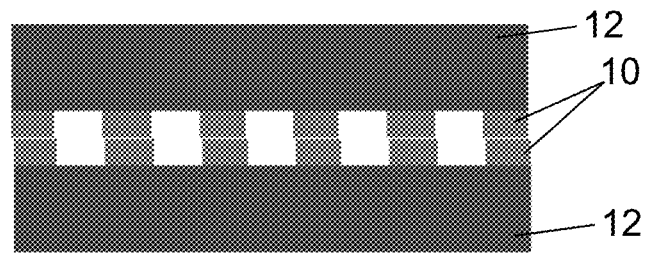
FIGS. 3a-3c illustrates a further embodiments of the layer arrangement of DOE.
Figure 3B:
Figure 3C:
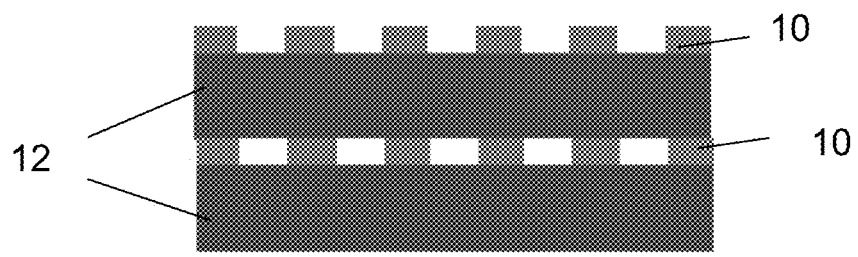

In another aspect, the DOE may include pairs of the substrates of glass 12 and microstructure layers 10. For an example, as shown in FIGS. 3a-3c, the DOE includes two pairs of the substrates of glass 12 and microstructure layers 10. As shown in FIG. 3a, the microstructure layers 10 are arranged in a manner so that they contact with each other. Alternatively, as shown in FIG. 3b, the microstructure layer 10 are arranged on both side of one glass 12. Additionally, the pairs of the microstructure layers 10 and the substrates of glass 12 are arranged in an alternate manner.

In the present invention, the DOE is produced with a high precision in term of at least the height of the grating structure in a simple and easy manner, which can reduce the cost of the production and also increase the efficiency thereof.

What is claimed is:

1. A diffractive optical element, comprising:
    a substrate of glass, the glass comprising $Al_2O_3$, alkaline metal oxides $M_2O$, and alkaline earth metal oxides MO with a sum of content $\Sigma Al_2O_3+M_2O+MO$ greater than 5 wt %, the substrate of glass exhibiting a refractive index in a range from 1.40 to 2.2;
    a microstructure layer arranged on the substrate of glass;
    a ratio of dry etching speed in thickness direction of the substrate of glass to that of the microstructure layer is no more than 1:2 so that the substrate of glass is an etching stop layer; and
    a dry etching speed in a horizontal direction of the substrate of glass is substantially equal to that of the microstructure layer.

2. The diffractive optical element of claim 1, wherein the ratio of dry etching speed in thickness direction is no more than 1:20.

3. The diffractive optical element of claim 1, wherein the sum of content $\Sigma Al_2O_3+M_2O+MO$ is greater than or equal to 10 wt %.

4. The diffractive optical element of claim 1, wherein the microstructure layer has a feature dimension with an etched width less than 2000 µm.

5. The diffractive optical element of claim 1, wherein the microstructure layer has a step with an etched depth less than 1000 µm.

6. The diffractive optical element of claim 5, further comprising a deviation between the etched depth and a mean etch depth that is less than 30%.

7. The diffractive optical element of claim 1, wherein the microstructure layer has a total thickness ($T_{max}$) that equals a largest etching depth ($H_{max}$) plus a tolerance ($\delta$).

8. The diffractive optical element of claim 1, wherein the substrate of glass has a surface roughness of less than 10 nm on an un-etched region.

9. The diffractive optical element of claim 1, wherein the microstructure layer is made of a material selected from a group consisting of silicon oxide, silicon nitride, $TiO_2$, and combinations thereof.

10. The diffractive optical element of claim 1, wherein the microstructure layer is nonconductive and exhibits an electric resistivity larger than $10^{10}$ Ω·m.

11. The diffractive optical element of claim 1, wherein the substrate of glass has a refractive index substantially equal to that of the microstructure layer.

12. The diffractive optical element of claim 1, wherein the microstructure layer exhibits a refractive index in a range from 1.4 to 2.2.

13. The diffractive optical element of claim 1, wherein the substrate of glass exhibits an internal transmittance of higher than 96% in the wavelength range of 400 nm to 1500 nm.

14. The diffractive optical element of claim 1, wherein the substrate of glass exhibits a transmittance of less than 30% when the wavelength is lower than 200 nm.

15. The diffractive optical element of claim 1, wherein the diffractive optical element exhibits an efficiency of higher than 30%.

16. The diffractive optical element of claim 1, further comprising a further layer on a location selected from a group consisting of an upper surface of the microstructure layer, a bottom surface of the substrate of glass, and between the microstructure layer and the substrate of glass.

17. The diffractive optical element of claim 16, wherein the further layer is an electric conduction layer or a protection layer.

18. The diffractive optical element of claim 17, wherein the electric conduction layer is an electric conductive indium tin oxide (ITO) layer or an electric conductive metal layer.

19. The diffractive optical element of claim 1, wherein the etching speed in the thickness direction is in a range from 0.01 to 0.8 µm/min for an etching gas of $C_4F_8$ or $SF_6$ with plasma power 1600 W, a substrate power 200 W; a gas flow of 25 sccm, and a pressure 0.2 Pa.

20. The diffractive optical element of claim 1, wherein the substrate of glass exhibits a Total Thickness Variation (TTV) of less than 30 µm.

21. The diffractive optical element of claim 1, wherein the substrate of glass exhibits a warp of less than 400 µm.

22. The diffractive optical element of claim 1, further comprising a second microstructure layer arranged on an opposite side of the substrate of glass from the microstructure layer.

23. The diffractive optical element of claim 1, further comprising:
    a second substrate of glass;
    a second microstructure layer arranged on the second substrate of glass;
    a ratio of dry etching speed in thickness direction of the second substrate of glass to that of the second microstructure layer is no more than 1:2 so that the second substrate of glass is an etching stop layer; and
    a dry etching speed in a horizontal direction of the second substrate of glass is substantially equal to that of the second microstructure layer.

24. The diffractive optical element of claim 23, wherein the substrate and second substrate of glass are arranged so that the microstructure layer and the second microstructure layer contact each other.

25. The diffractive optical element of claim 1, wherein the microstructure layer includes a plurality of steps of microstructure.

26. The diffractive optical element of claim 1, wherein the substrate of glass has a coefficient of thermal expansion (CTE) of at most 15 ppm/K.

27. The diffractive optical element of claim 1, further comprising a ratio of CTE of the substrate of glass to that of the microstructure layer of at least 0.1.

* * * * *